United States Patent
Tsumagari et al.

(10) Patent No.: US 9,504,961 B2
(45) Date of Patent: Nov. 29, 2016

(54) EXHAUST GAS PURIFICATION SYSTEM AND OZONE GENERATOR

(71) Applicant: HINO MOTORS, LTD., Tokyo (JP)

(72) Inventors: Ichiro Tsumagari, Hino (JP); Yoshihiro Kawada, Hino (JP)

(73) Assignee: HINO MOTORS, LTD., Tokyo (JP)

(*) Notice: Subject to any disclaimer, the term of this patent is extended or adjusted under 35 U.S.C. 154(b) by 0 days.

(21) Appl. No.: 14/762,913

(22) PCT Filed: Jan. 30, 2014

(86) PCT No.: PCT/JP2014/052058
§ 371 (c)(1),
(2) Date: Jul. 23, 2015

(87) PCT Pub. No.: WO2014/119651
PCT Pub. Date: Aug. 7, 2014

(65) Prior Publication Data
US 2015/0360177 A1    Dec. 17, 2015

(30) Foreign Application Priority Data
Feb. 1, 2013  (JP) ................. 2013-018136

(51) Int. Cl.
*F01N 3/00* (2006.01)
*F01N 3/10* (2006.01)
(Continued)

(52) U.S. Cl.
CPC ........... *B01D 53/9431* (2013.01); *C01B 13/10* (2013.01); *C01B 13/11* (2013.01);
(Continued)

(58) Field of Classification Search
CPC ........... F01N 2610/02; F01N 2610/06; F01N 2610/08; F01N 2610/11; F01N 3/2066; B01D 2251/104; B01D 2256/10; B01D 2256/12; B01D 53/22; B01D 53/261; B01D 53/9431; C01B 13/10; C01B 13/11; C01B 2201/64; C25B 1/13; Y02T 10/24

USPC .................. 60/275, 286, 301, 303
See application file for complete search history.

(56) References Cited

U.S. PATENT DOCUMENTS 3,884,819 A    5/1975  Schultz et al.
5,992,464 A *  11/1999  Cowell ................... B01F 3/028
                                                137/888
(Continued)

FOREIGN PATENT DOCUMENTS

JP    06-24710 A       2/1994
JP    2012-193620 A   10/2012
(Continued)

OTHER PUBLICATIONS

International Search Report prepared by the Japanese Patent Office on Apr. 8, 2014, for International Application No. PCT/JP2014/052058.

*Primary Examiner* — Thomas Denion
*Assistant Examiner* — Diem Tran
(74) *Attorney, Agent, or Firm* — Sheridan Ross P.C.

(57) ABSTRACT

An exhaust purifying system includes a selective reduction catalyst provided on an exhaust passage of an engine, a fluid supply device for supplying a urea fluid to a section of the exhaust passage that is upstream of the selective reduction catalyst, a gas separator for separating source gas into oxygen-enriched gas and nitrogen-enriched gas, an ozone generator that includes an ozone producing space, to which the oxygen-enriched gas is introduced, and produces ozone from the introduced oxygen-enriched gas, an ozone supplier for supplying ozone to a section of the exhaust passage that is upstream of the selective reduction catalyst, a vortex tube for separating the nitrogen-enriched gas into cool air and warm air and discharging the cool air and the warm air, and a cooling device for cooling the ozone producing space by applying the cool air discharged from the vortex tube to the ozone generator.

5 Claims, 6 Drawing Sheets

(51) Int. Cl.
*B01D 53/94* (2006.01)
*C01B 13/11* (2006.01)
*F01N 3/20* (2006.01)
*C01B 13/10* (2006.01)
*C25B 1/13* (2006.01)
*B01D 53/22* (2006.01)
*B01D 53/26* (2006.01)

(52) U.S. Cl.
CPC .............. *C25B 1/13* (2013.01); *F01N 3/2066* (2013.01); *B01D 53/22* (2013.01); *B01D 53/261* (2013.01); *B01D 2251/104* (2013.01); *B01D 2256/10* (2013.01); *B01D 2256/12* (2013.01); *C01B 2201/64* (2013.01); *F01N 2240/38* (2013.01); *F01N 2610/02* (2013.01); *F01N 2610/06* (2013.01); *F01N 2610/08* (2013.01); *F01N 2610/11* (2013.01); *Y02T 10/24* (2013.01)

(56) References Cited

U.S. PATENT DOCUMENTS

| | | | |
|---|---|---|---|
| 6,193,852 B1* | 2/2001 | Caracciolo | C01B 13/11 204/176 |
| 6,959,538 B2* | 11/2005 | Cho | B01D 53/323 60/274 |
| 7,368,094 B2* | 5/2008 | Cho | B01D 53/32 204/176 |
| 7,790,127 B1* | 9/2010 | Lee | B01D 53/90 422/105 |
| 9,021,792 B2* | 5/2015 | Hosoya | F01N 13/009 60/286 |
| 2004/0188238 A1* | 9/2004 | Hemingway | F01N 13/009 204/164 |
| 2008/0233002 A1 | 9/2008 | Mizuno et al. | |

FOREIGN PATENT DOCUMENTS

| | | | |
|---|---|---|---|
| JP | 2013-010647 | * | 1/2013 |
| JP | 2013-10647 A | | 1/2013 |
| WO | WO 2005/094907 A | | 10/2005 |

* cited by examiner

EXHAUST GAS PURIFICATION SYSTEM AND OZONE GENERATOR

CROSS REFERENCE TO RELATED APPLICATIONS

This application is a national stage application under 35 U.S.C. 371 and claims priority to and the benefit of PCT Application No. PCT/JP2014/052058 having an international filing date of Jan. 30, 2014, which designated the United States, which PCT application claimed priority to and the benefit of Japanese Patent Application No. 2013-018136 filed on Feb. 1, 2013, the disclosures of each of which are incorporated herein by reference.

FIELD OF THE INVENTION

The present invention relates to an exhaust purifying system for purifying exhaust gas using ozone and an ozone producing device for producing ozone.

BACKGROUND OF THE INVENTION

Ozone has a high oxidation potential and is used in a variety of fields for purposes such as pollutant degradation and sterilization. One of the devices that uses ozone is an exhaust purifying system for purifying exhaust gas of an internal combustion engine (hereinafter, referred to as an engine).

Systems using a selective reduction catalyst (urea SCR systems) are already in practical use as exhaust purifying systems. One such system is a proposed selective catalytic reduction system that adds ozone to a section upstream of a selective reduction catalyst with a urea fluid (e.g., refer to Patent Document 1). A portion of nitric monoxide (NO) contained in exhaust gas is converted to nitric dioxide ($NO_2$) by adding ozone ($O_3$) to the exhaust gas. This brings the ratio of NO to $NO_2$ contained in the exhaust gas close to 1 to 1. When the ratio of NO to $NO_2$ approaches 1 to 1, the reduction reaction of NO and $NO_2$ to nitrogen ($N_2$) accelerates.

PRIOR ART DOCUMENT

Patent Document

Patent Document 1: Japanese Laid-Open Patent Publication No. 2012-193620

SUMMARY OF THE INVENTION

Ozone has another property of being easily self-decomposed. There are a number of conditions to develop self-decomposition of ozone. For example, a high temperature such as 40 degrees C. develops self-decomposition of ozone. For this reason, typical ozone producing devices have a cooling device such as an air-cooling fan or a water-cooler.

An exhaust purifying system and an ozone producing device need a cooling device having a high cooling efficiency in order to increase ozone production efficiency. Such a cooling device tends to be large. Considering that, there are drawbacks that a vehicle especially has a limited space to install the cooling device for the exhaust purifying system and furthermore, the cooling device is easily affected by heat released from an engine and the like.

It is an object of the present invention to increase ozone production efficiency in an exhaust purifying system and an ozone producing device.

In accordance with one aspect of the present invention, an exhaust purifying system is provided to achieve the above object. The exhaust purifying system comprises a selective reduction catalyst provided on an exhaust passage of an engine, a fluid supply device for supplying a urea fluid to a section of the exhaust passage that is upstream of the selective reduction catalyst, a gas separator for separating source gas into oxygen-enriched gas and nitrogen-enriched gas, an ozone generator that includes an ozone producing space, to which the oxygen-enriched gas is introduced, and produces ozone from the introduced oxygen-enriched gas, an ozone supplier for supplying ozone to a section of the exhaust passage that is upstream of the selective reduction catalyst, a vortex tube for separating the nitrogen-enriched gas into cool air and warm air and discharging the cool air and the warm air, and a cooling device for cooling the ozone producing space by applying the cool air discharged from the vortex tube to the ozone generator.

In accordance with another aspect of the present invention, an ozone producing device is provided. The ozone producing device comprises a gas separator for separating source gas into oxygen-enriched gas and nitrogen-enriched gas, an ozone generator that includes an ozone producing space, to which the oxygen-enriched gas is introduced, and produces ozone from the introduced oxygen-enriched gas, a vortex tube for separating the nitrogen-enriched gas into cool air and warm air and discharging the cool air and the warm air, and a cooling device for cooling the ozone producing space by applying the cool air discharged from the vortex tube to the ozone generator.

In accordance with another aspect of the present invention, an exhaust purifying system is provided. The exhaust purifying system comprises a selective reduction catalyst provided on an exhaust passage of an engine, a fluid supply device for supplying a urea fluid to a section of the exhaust passage that is upstream of the selective reduction catalyst, a gas separator for separating source gas into oxygen-enriched gas and nitrogen-enriched gas, an ozone generator that includes an ozone producing space, to which the oxygen-enriched gas is introduced, and produces ozone from the introduced oxygen-enriched gas, an ozone supplier for supplying ozone to a section of the exhaust passage that is upstream of the selective reduction catalyst, and a vortex tube for separating the oxygen-enriched gas into cool air and warm air and discharging the cool air and the warm air. The cool air discharged from the vortex tube is introduced to the ozone generator to produce ozone from the oxygen-enriched gas at a low temperature.

In accordance with another aspect of the present invention, an ozone producing device is provided. The ozone producing device comprises a gas separator for separating source gas into oxygen-enriched gas and nitrogen-enriched gas, an ozone generator that includes an ozone producing space, to which the oxygen-enriched gas is introduced, and produces ozone from the introduced oxygen-enriched gas, and a vortex tube for separating the oxygen-enriched gas into cool air and warm air and discharging the cool air and the warm air. The cool air discharged from the vortex tube is introduced to the ozone generator to produce ozone from the oxygen-enriched gas at a low temperature.

DETAILED DESCRIPTION OF THE PREFERRED EMBODIMENTS

First Embodiment

An exhaust purifying system and an ozone producing device according to a first embodiment will now be described. In the present embodiment, the exhaust purifying system is installed in a vehicle equipped with a diesel engine.

Figure 1:
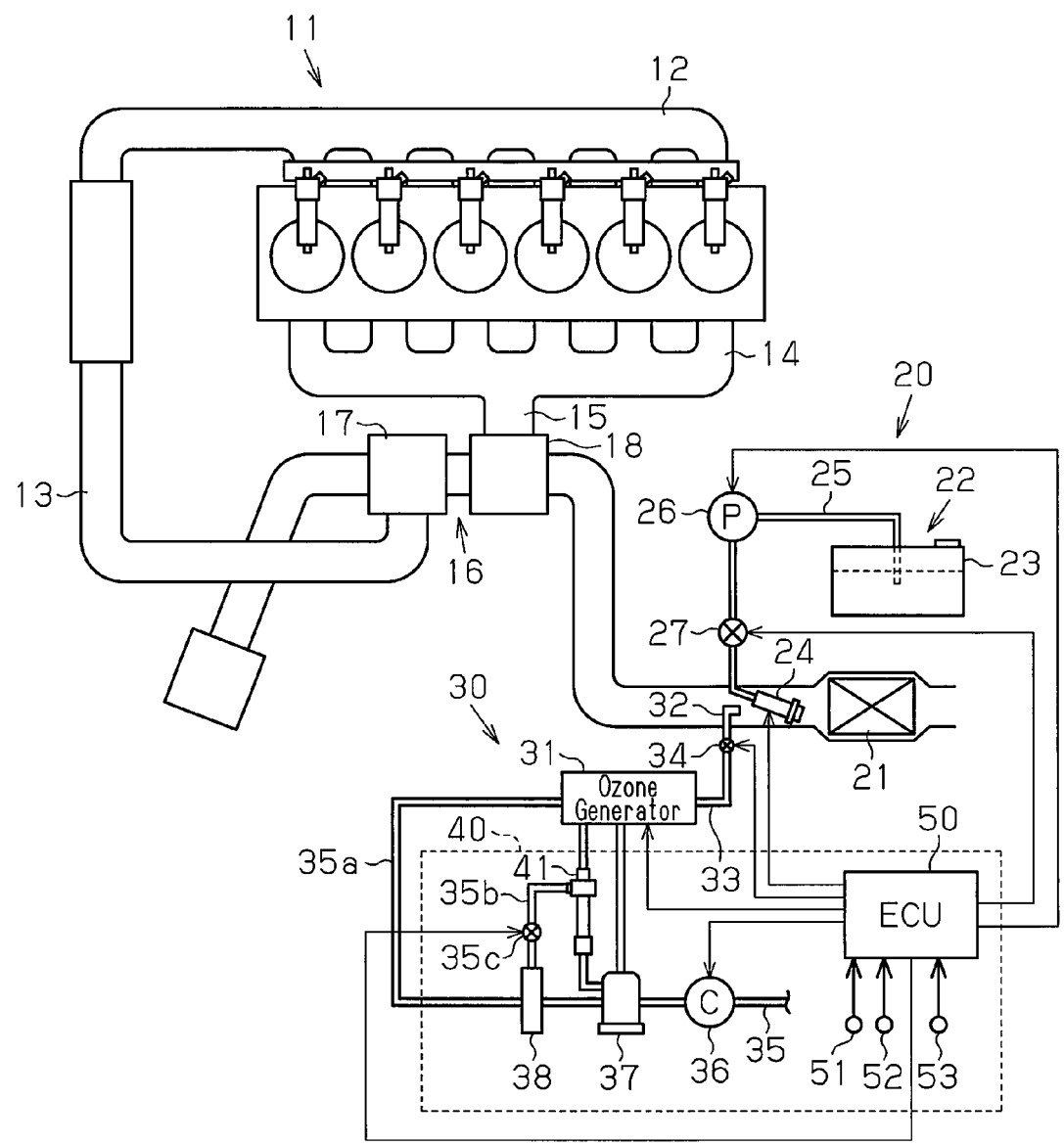
FIG. 1 is a schematic view of an exhaust purifying system together with an engine according to a first embodiment of the present invention.

As shown in FIG. 1, an engine 11 includes an intake manifold 12 and an exhaust manifold 14. The intake manifold 12 is connected to an intake passage 13, and the exhaust manifold 14 is connected to an exhaust passage 15. A compressor 17 of a turbocharger 16 is arranged on the intake passage 13, and the turbine 18 of the turbocharger 16 is arranged on the exhaust passage 15.

Exhaust Purifying System

An exhaust purifying system 20 is arranged downstream of the turbine 18 on the exhaust passage 15. The exhaust purifying system 20 includes an oxidation catalyst (not shown), a diesel particulate filter (DPF) (not shown), and a selective reduction catalyst 21 on the exhaust passage 15. The selective reduction catalyst 21 is arranged downstream of the oxidation catalyst and the DPF on the exhaust passage 15. The selective reduction catalyst 21 is a commonly-known catalyst and, for example, made from zeolite or zirconia supported by a honeycomb carrier.

The exhaust purifying system 20 further includes a urea solution supply device 22 as a fluid supply device, an ozone producing device 30, and an ECU 50 for controlling the devices. The urea solution supply device 22 supplies a urea solution as a urea fluid. The ozone producing device 30 produces ozone from source gas and supplies the produced ozone to a section of the exhaust passage 15 that is upstream of the selective reduction catalyst 21. When ozone is added to exhaust gas, NO contained in the exhaust gas is oxidized to $NO_2$ as shown in the reaction formula (1).

$$NO+O_3 \rightarrow NO_2+O_2 \qquad (1)$$

The urea solution supply device 22 stores a urea solution and supplies the urea solution to a section of the exhaust passage 15 that is upstream of the selective reduction catalyst 21. The urea solution is hydrolyzed with heat of the exhaust gas to produce ammonia ($NH_3$). The ammonia reacts with nitric monoxide and nitric dioxide that are contained in the exhaust gas and reduces those to nitrogen (gaseous nitrogen) as shown in the reaction formula (2).

$$NO+NO_2+2NH_3 \rightarrow 2N_2+3H_2O \qquad (2)$$

As shown in the reaction formula (2), this reduction reaction accelerates as the ratio of $NO:NO_2$ approaches to 1:1. This is because the ratio is made close to 1:1 by adding ozone and oxidizing NO to $NO_2$.

Urea Solution Supply Device

The urea solution supply device 22 includes a urea solution tank 23 for storing a urea solution, a urea solution supply nozzle 24 for adding the urea solution to a section upstream of the selective reduction catalyst 21, and a urea solution supply passage 25 for connecting the urea solution tank 23 to the urea solution supply nozzle 24. A pump 26 for pumping the urea solution from the urea solution tank 23 to the urea solution supply nozzle 24 and a flow rate regulating valve 27 for adjusting a supply amount of urea solution are arranged on the urea solution supply passage 25. The ECU 50 drives the pump 26 and controls the opening amount of the flow rate regulating valve 27. The ECU 50 also applies a drive pulse to the urea solution supply nozzle 24. When receiving a drive pulse, the urea solution supply nozzle 24 is opened to inject the urea solution to the exhaust passage 15.

Ozone Producing Device

An ozone producing device 30 will now be described. The ozone producing device 30 includes an ozone generator 31 having an ozone producing space. The ozone generator 31 is a device having a commonly-known structure such as electron irradiation, irradiation-induce, light irradiation, or electrolysis type. The present embodiment employs an electrostatic discharge type device. The ozone generator 31 includes a pair of electrode plates arranged with the ozone producing space in between, a dielectric lying between the electrode plates, and an AC high-voltage power supply. Ozone is generated from oxygen (gaseous oxygen) present in the ozone producing space by applying a high voltage across the electrode plates by the AC high-voltage power supply.

An air introduction passage 35 is connected to the upstream of the ozone generator 31. The first end of the air introduction passage 35 opens to the atmosphere, and air as source gas is drawn into the air introduction passage 35 from the outside through the first end. A compressor 36, a dryer 37, and an oxygen enrichment unit 38 as a gas separator are arranged on the air introduction passage 35 in that order from the first end. The compressor 36 compresses air introduced from the first end of the air introduction passage 35 and introduces the air to the dryer 37. For example, the dryer 37 is a dryer that uses a hollow fiber membrane. The dryer 37 dries the compressed air and supplies it to the oxygen enrichment unit 38.

The oxygen enrichment unit 38 has an oxygen-enriched film. The oxygen-enriched film has higher oxygen permeability than nitrogen permeability. That is, oxygen permeates through the oxygen-enriched film at a higher speed than the speed at which nitrogen permeates through the oxygen-enriched film. The oxygen-enriched film separates the compressed air into oxygen-enriched gas as high oxygen concentration gas and nitrogen-enriched gas as high nitrogen concentration gas by this difference of the permeation speeds. The oxygen-enriched film does not completely separate the compressed air into oxygen and nitrogen. For example, when compressed air having an oxygen concentration of 20% permeates through the oxygen-enriched film, the oxygen concentration increases to be approximately 35%. Alternatively, when the primary pressure of the oxygen-enriched film is from 0.5 MPa to 1 MPa, the back pressure of the oxygen-enriched film reaches to a value from 0.4 to 0.6 kPa.

A first supply passage 35a and a second supply passage 35b are connected to the oxygen enrichment unit 38. Oxygen-enriched gas that permeated through the oxygen-enriched film is pumped through the first supply passage 35a, and nitrogen-enriched gas is pumped through the second supply passage 35b. The exit of the first supply passage 35a is connected to the ozone generator 31. That is, the oxygen-enriched gas is introduced to the ozone generator 31. Thus, when producing ozone from oxygen-enriched gas, the amount of ozone produced can be approximately 1.75 times as much as when using air under the same condition of a gas flow rate and electric power supplied to the ozone generator 31.

An ozone supply passage 33 is arranged downstream of the ozone generator 31, and a flow rate regulating valve 34 is arranged on the ozone supply passage 33. The ECU 50 adjusts the amount of ozone supplied to the exhaust passage 15 by controlling the opening amount of the flow rate regulating valve 34. An ozone supply nozzle 32 as an ozone supplier is arranged at the exit of the ozone supply passage 33. A discharge port of the ozone supply nozzle 32 is arranged upstream of the urea solution supply nozzle 24 on the exhaust passage 15. The ECU 50 applies a drive pulse to the ozone supply nozzle 32. When receiving the drive pulse, the ozone supply nozzle 32 is opened to inject ozone to the exhaust passage 15.

The ECU 50 receives an input of a detection signal from each of sensors, a temperature sensor 51, a rotation sensor 52 for sensing the engine speed, and a load sensor 53 such as a throttle position sensor. The temperature sensor 51 senses the temperature of exhaust introduced to the selective reduction catalyst 21. The ECU 50 stores data or a map to change opening amounts of the flow rate regulating valve 27 and 34, a pump driving time, an operation condition of the ozone generator 31, and the like in accordance with the engine speed, engine load, and exhaust gas temperature. The ECU 50 also stores a ratio map indicative of the ratio of $NO:NO_2$ changed according to exhaust temperature, load, and the like. The ECU 50 estimates the ratio of $NO:NO_2$ based on comparison of the engine operating condition at the moment with the stored map and computes an ozone supply amount from the ratio and others. The ECU 50 drives the compressor 36 on a condition according to the computed ozone supply amount.

Figure 2:
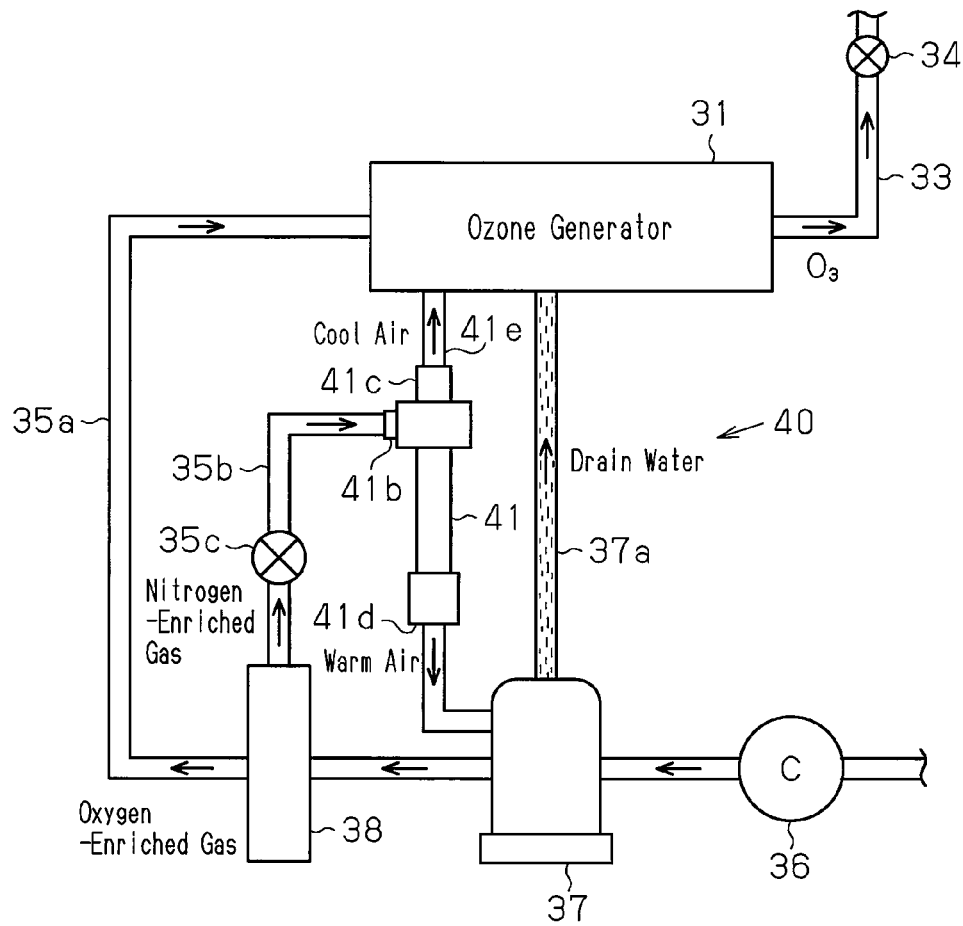
FIG. 2 is a schematic view of the exhaust purifying system of FIG. 1.

The ozone producing device 30 includes a cooling device 40 for cooling the ozone generator 31. As shown in FIG. 2, the cooling device 40 includes the compressor 36, the dryer 37, and a vortex tube 41. That is, the compressor 36 and the dryer 37 also function as the cooling device 40 of the ozone generator 31.

Figure 3:
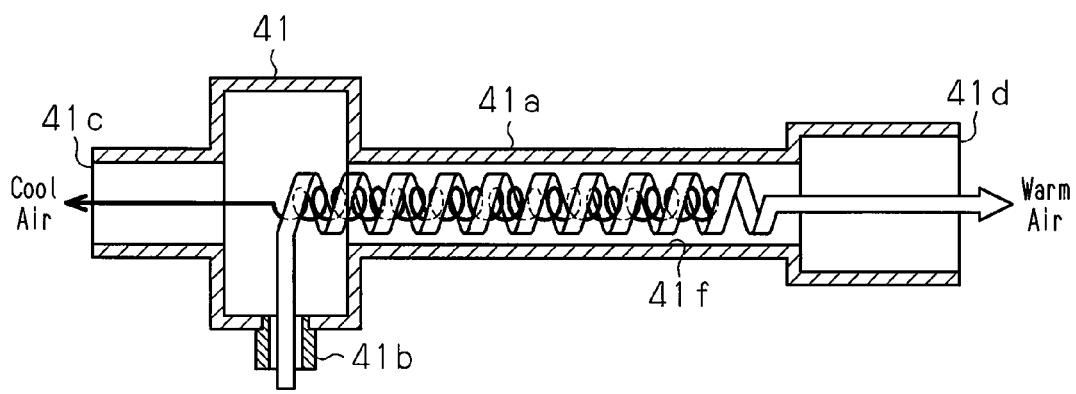
FIG. 3 is a schematic view of the vortex tube of FIG. 2.

The second supply passage 35b branched off from the oxygen enrichment unit 38 is connected to an inlet 41b of the vortex tube 41. As shown in FIG. 3, the vortex tube 41 includes a tube 41a, an inlet 41b, a cool air outlet 41c, and a warm air outlet 41d. A flow passage 41f is defined in the tube 41a and connected to the inlet 41b, the cool air outlet 41c, and the warm air outlet 41d. As described above, nitrogen-enriched gas is introduced from the inlet 41b and is supplied to the flow passage 41f. In the flow passage 41f, the nitrogen-enriched gas rotates in a spiral manner at a high speed and is separated into warm and cool air near the warm air outlet 41d. The warm air is ejected from the warm air outlet 41d. The warm air outlet 41d is connected to the dryer 37. While outside air pumped by the compressor 36 passes through a flow passage in the dryer, the warm air brought back to the dryer 37 travels through a flow passage different from the flow passage of the outside air and is discharged out of the dryer with water separated in the dryer. The cool air turns back before the warm air outlet 41d and travels in the reversed direction while rotating in the flow passage 41f. The cool air is discharged from the cool air outlet 41c.

As shown in FIG. 2, the cool air outlet 41c is connected to the ozone generator 31 via the cool air passage 41e. The warm air brought back to the dryer 37 from the vortex tube 41 pushes out drain water discharged from the dryer 37 to a drain water supply passage 37a. This supplies the drain water to the drain water supply passage 37a. The "drain water" described here is water discharged from the dryer 37 and includes water in a liquid state, water in a gas state (i.e., water vapor), or both. The exit of the drain water supply passage 37a is connected to the ozone generator 31 at a different position from that of the first supply passage 35a.

Figure 4:
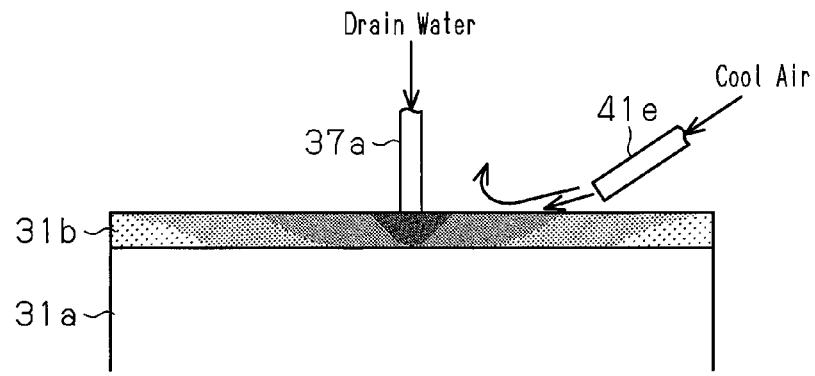
FIG. 4 is a schematic view illustrating a primary part of the ozone generator of FIG. 2.

As shown in FIG. 4, the ozone generator 31 includes a body 31a, which accommodates electrodes, and an absorbent material 31b arranged outside of the body 31a. A housing of the body 31a is highly resistant to ozone and made of a metallic material having high thermal conductivity. For example, the absorbent material 31b is a plate-like member sized the same as a wall of the housing and formed from a substance having high moisture absorbency such as a zeolite, zirconia, or porous graphite material. The exit of the drain water supply passage 37a is arranged near the absorbent material 31b. The exit of the drain water supply passage 37a is arranged to contact to the absorbent material 31b or is arranged near the face of the absorbent material 31b. The drain water discharged from the exit of the drain water supply passage 37a is poured in the absorbent material 31b. The absorbent material 31b receives and absorbs the poured drain water. The drain water discharged to the absorbent material 31b permeates the entire absorbent material 31b from the poured place.

The exit of the cool air passage 41e is arranged near the face of the absorbent material 31b. The exit of the cool air passage 41e is arranged so that its central axis lies at an angle with the face of the absorbent material 31b. For this reason, the cool air ejected from the exit of the cool air passage 41e comes into the face of the absorbent material 31b at an angle. This allows for the absorbent material 31b having a larger area exposed to the cool air than when the exit of the cool air passage 41e is arranged so that the cool air perpendicularly comes into the face.

The dried cool air is ejected onto the absorbent material 31b soaked with drain water to cool the absorbent material 31b and vaporize the drain water. Ejection of the cool air onto the ozone generator 31 alone cools the ozone producing space. However, vaporization of the drain water of the absorbent material 31b removes heat from the absorbent material 31b and further cools the absorbent material 31b. The ejected cool air is dry, and this promotes vaporization of the drain water.

The body 31a of the ozone generator 31 is entirely cooled by the cooled absorbent material 31b, and the ozone producing space is cooled by the electrodes, which are accommodated by the body 31a. Self-decomposition of ozone is promoted at near 40 degrees C. (i.e., the self-decomposition speed is increased), and production efficiency of ozone is increased at a low temperature. The vortex tube 41 is long and thin and has the length of a few hundreds millimeters, for example. This suppresses size increase of the cooling device 40.

Operation

Operation of the exhaust purifying system 20 will now be described. In the present embodiment, the ECU 50 starts driving the ozone producing device 30 based on an exhaust gas temperature. For example, the ECU 50 drives the ozone producing device 30 when an exhaust gas temperature obtained from the temperature sensor 51 is a low temperature of 200 degrees C. or less. When the exhaust gas temperature is a high temperature exceeding 200 degrees C., the ECU 50 stops the ozone producing device 30. This is because, when the exhaust gas temperature exceeds 200 degrees C., reduction reaction of $NO_x$ promptly progresses by the selective reduction catalyst 21 without converting a portion of NO contained in the exhaust gas to $NO_2$, and $NO_x$ reacts with ammonia to be promptly reduced to $N_2$.

The ECU 50 estimates the amount of NO discharged from the engine 11 per unit time based on the ratio map and the operating condition of the engine 11, which are stored in a memory. The ECU 50 computes an ozone mass equivalent to the amount of NO or a predetermined portion of the ozone mass relative to the amount of NO as an ozone supply amount per unit time, and adjusts the compressor flow rate and the opening amount of the flow rate regulating valve 34 based on the computed ozone supply amount. The ECU 50 sets the frequency of a pulse applied to the electrodes of the ozone generator 31 and the electric discharge condition of output power and the like based on the computed ozone supply amount.

The ECU 50 computes an ejection amount of urea solution per unit time to eject to the selective reduction catalyst 21 based on the operating condition of the engine 11 and the state of the selective reduction catalyst 21. The computation is performed in each predetermined operation cycle. The operating condition of the engine 11 is determined based on detection signals from sensors such as the temperature sensor 51, the rotation sensor 52, and the load sensor 53. The state of the selective reduction catalyst 21 is determined according to a cumulative amount of already ejected urea solution, a signal from a $NO_x$ sensor arranged on the exhaust passage 15, and the like. When the ejection amount of urea solution is determined, the ECU 50 drives the pump 26, controls the opening amount of the flow rate regulating valve 27 according to the ejection amount, and applies a drive pulse to the urea solution supply nozzle 24. As a result, the urea solution supply nozzle 24 is opened with the drive pulse, and the urea solution is injected to the exhaust passage 15.

When the ECU 50 drives the compressor 36, outside air is introduced through the inlet of the air introduction passage 35 and pumped to the dryer 37. Dry air dried by the dryer 37 is supplied to the oxygen enrichment unit 38, which separates the dry air into oxygen-enriched gas and nitrogen-enriched gas. The oxygen-enriched gas is introduced to the space between the electrodes of the ozone generator 31. Excitation or dissociation of oxygen molecules occurs by electric discharge between the electrodes to produce ozone. The produced ozone is sent to the ozone supply nozzle 32 through the ozone supply passage 33. The ECU 50 applies a drive pulse to the ozone supply nozzle 32 at predetermined intervals. The ozone supply nozzle 32 is opened with the received drive pulse to inject the ozone to the exhaust passage 15.

As described above, the ozone injected to the exhaust passage 15 oxidizes NO contained in exhaust to $NO_2$ to bring the $NO:NO_2$ ratio close to 1:1. The urea solution injected to the exhaust passage 15 is hydrolyzed to produce ammonia. The selective reduction catalyst 21 causes a reaction of ammonia with NO and $NO_2$ to reduce NO and $NO_2$ to $N_2$, which is sent out to the downstream.

When driving the ozone generator 31, the ECU 50 puts the flow rate regulating valve 35c arranged on the second supply passage 35b into an open state. Nitrogen-enriched gas supplied to the second supply passage 35b is introduced to the inside of the vortex tube 41 from the inlet 41b of the vortex tube 41.

Cool air separated by the vortex tube 41 is ejected to the absorbent material 31b of the ozone generator 31 through the cool air passage 41e. Warm air separated by the vortex tube 41 is brought back to the dryer 37 through a tubal passage.

The drain water discharged from the dryer 37 is poured out to the absorbent material 31b through the drain water supply passage 37a. The absorbent material 31b is cooled by the cool air pumped from the vortex tube 41 and is further cooled by the effect of heat of evaporation of the drain water. The absorbent material 31b absorbs heat of the ozone generator 31 and cools the ozone producing space via the housing of the body 31a. The decreased temperature of the ozone producing space results in suppressing self-decomposition of ozone and increasing ozone production efficiency.

As described above, according to the exhaust purifying system of the first embodiment, the following advantages are obtained.

(1) The exhaust purifying system 20 includes the selective reduction catalyst 21, the urea solution supply device 22 for adding urea to the selective reduction catalyst 21, the oxygen enrichment unit 38 for separating air into oxygen-enriched gas and nitrogen-enriched gas, the ozone generator 31 for producing ozone from the oxygen-enriched gas, and the ozone supply nozzle 32 for supplying ozone to a section of the exhaust passage 15 that is upstream of the selective reduction catalyst 21. The exhaust purifying system 20, which is arranged downstream of the oxygen enrichment unit 38, includes the vortex tube 41 for separating nitrogen-enriched gas introduced from the oxygen enrichment unit 38 into cool air and warm air and discharging the cool air and the warm air and the cooling device 40 for cooling the ozone generator 31 by applying the cool air discharged from the vortex tube 41 to the ozone generator 31. Thus, the cool air ejected from the vortex tube 41 increases a cooling efficiency for the ozone generator 31, thereby suppressing self-decomposition of ozone in the ozone generator 31. Therefore, ozone production efficiency is increased without increasing the size of the cooling device.

(2) The exhaust purifying system 20 includes the compressor 36 for compressing air, which is arranged upstream of the oxygen enrichment unit 38, and the dryer 37 for drying compressed gas sent from the compressor 36 and sending the dried compressed gas to the oxygen enrichment unit 38. The exhaust purifying system 20 further includes the drain water supply passage 37a, which guides drain water, which is water removed from compressed gas by the dryer 37, to the ozone generator 31, and the absorbent material 31b, which is arranged in the ozone generator 31 and receives cool air ejected by the vortex tube 41. This promotes vaporization of drain water absorbed by the absorbent material 31b and allows the temperature of the ozone producing space to decrease compared to when simply ejecting cool air to the ozone generator 31. The drain water permeates the absorbent material 31b entirely, and vaporization of the drain water cools the entire body 31a.

Second Embodiment

A second embodiment of the present invention will now be described with reference to FIGS. 5 and 6. In the second embodiment, only the ozone producing device in the first embodiment is replaced with an ozone producing device 30. Like reference characters designate like or corresponding parts and the parts will not be described in detail.

Figure 5:
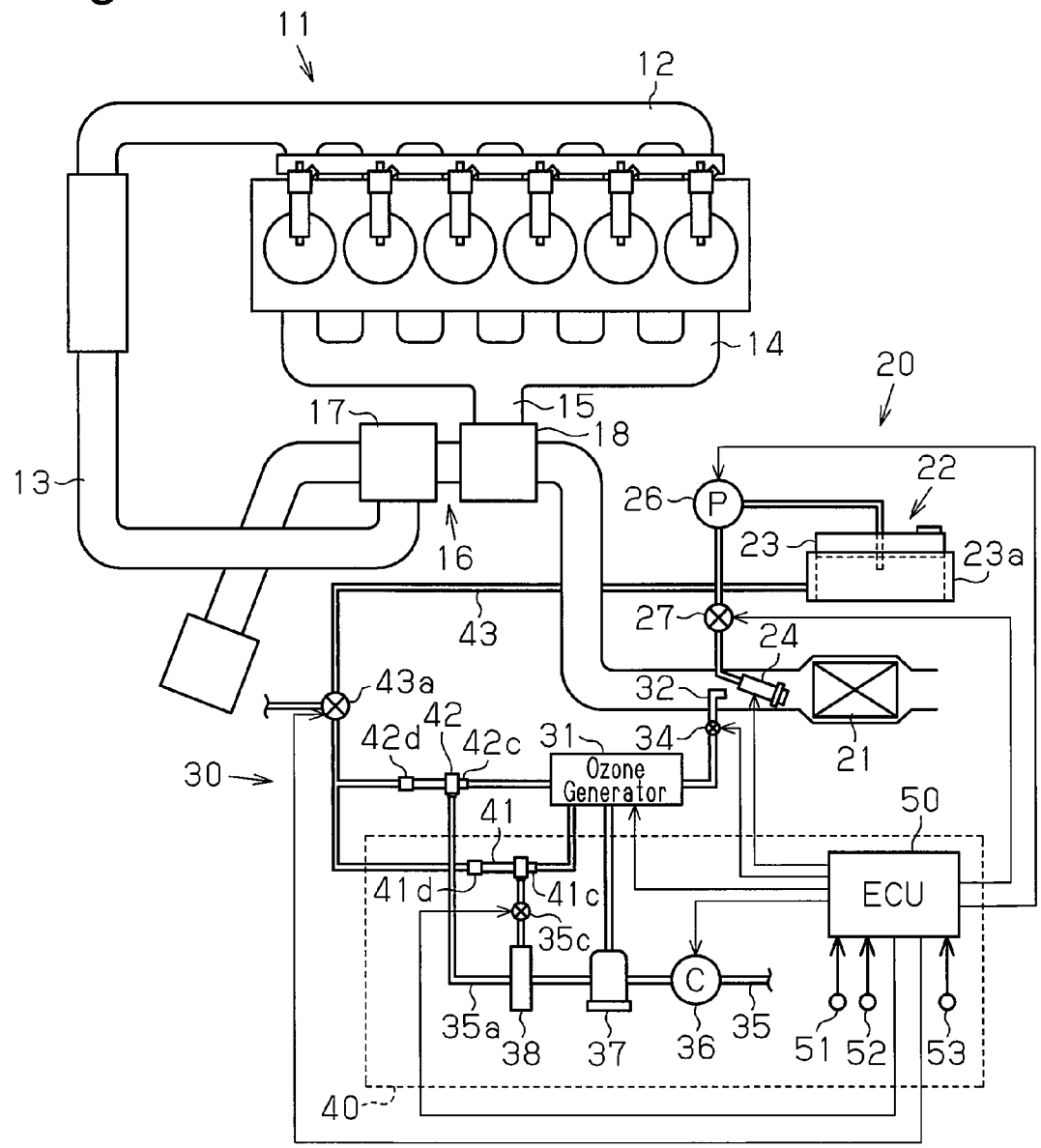
FIG. 5 is a schematic view of an exhaust purifying system together with an engine according to a second embodiment of the present invention.

As shown in FIG. 5, downstream of the oxygen enrichment unit 38, the vortex tube 41 is arranged on the second supply passage 35b, through which nitrogen-enriched gas is pumped, and the vortex tube 42 is arranged on the first supply passage 35a, through which oxygen-enriched gas is pumped. Hereinafter, the vortex tube 42 arranged on the first supply passage 35a is referred to as a first vortex tube 42, and the vortex tube 41 arranged on the second supply passage 35b is referred to as a second vortex tube 41. The first vortex tube 42 and the second vortex tube 41 have the same structure.

Figure 6:
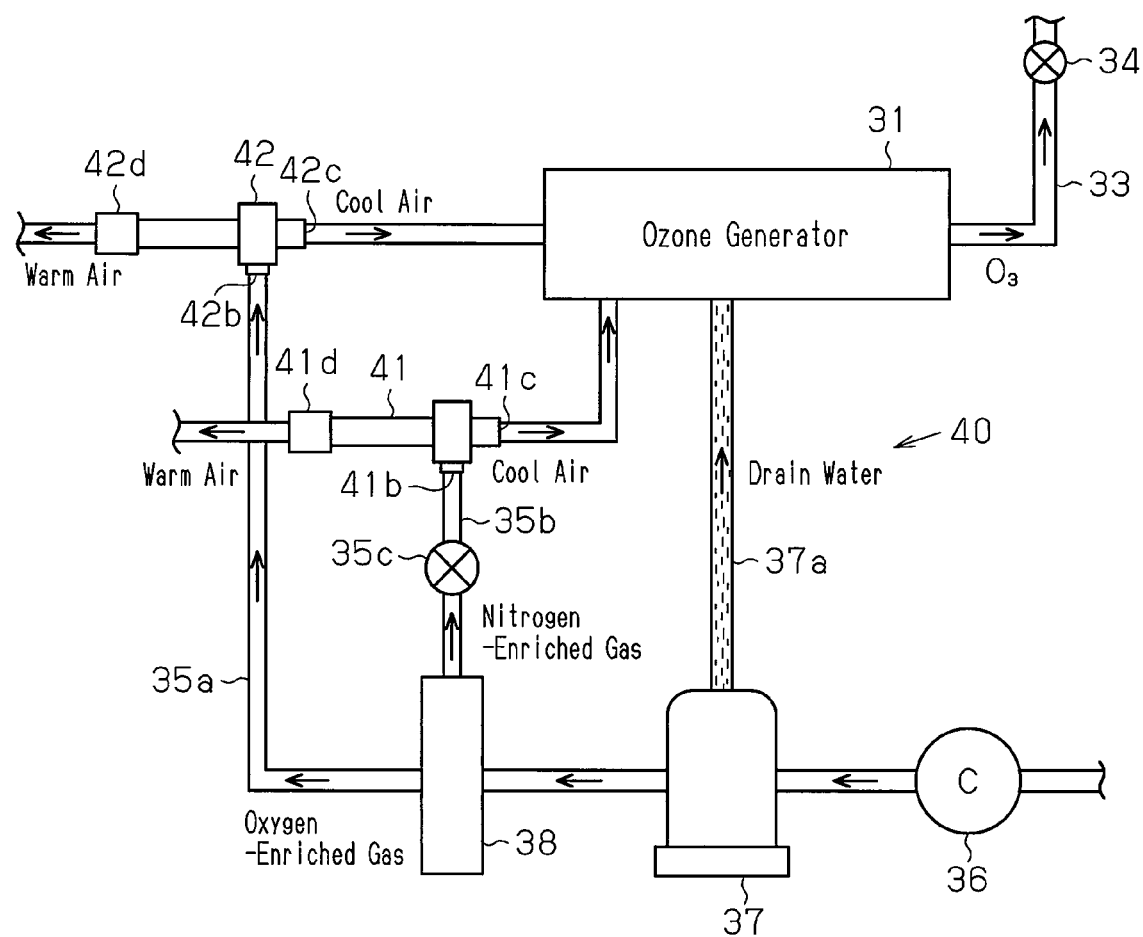
FIG. 6 is a schematic view of the exhaust purifying system of FIG. 5.

As shown in FIG. 6, an inlet 42b of the first vortex tube 42 is connected to the oxygen enrichment unit 38 via the first supply passage 35a. A cool air outlet 42c of the first vortex tube 42 is connected to the ozone generator 31 via the first supply passage 35a. That is, cool air from the first vortex tube 42, i.e., cooled oxygen-enriched gas, is introduced to the ozone generator 31. Thus, the oxygen-enriched gas as a source of ozone is cooled in advance, and this suppresses self-decomposition of ozone.

As shown in FIG. 5, a warm air outlet 42d of the first vortex tube 42 is connected to the warm air passage 43. The warm air passage 43 is connected to a heat exchanger 23a arranged on the outer circumference of the urea solution tank 23. The heat exchanger 23a exchanges heat between warm air and the urea solution tank 23 and heats a urea solution or keeps it warm. A urea solution is frozen in a cold environment, e.g., at a temperature such as minus 12 degrees C., and freezing of the urea solution is prevented by exchanging heat with the heat exchanger 23a. A three-way valve 43a is also arranged on the warm air passage 43. The warm air outlets 41d and 42d are connected to the engine 11 by opening the valve 43a. The warm air outlets 41d and 42d are connected to the outside by closing the valve 43a. This allows the ECU 50 to control opening and closing of the valve 43a to connect the warm air outlets 41d and 42d with the urea solution tank 23 only when there is a need to increase the temperature of the urea solution.

The cool air outlet 41c of the second vortex tube 41 is connected to the absorbent material 31b of the ozone generator 31 via the second supply passage 35b in the same way as the first embodiment. The warm air outlet 41d is connected to the warm air passage 43. Therefore, effective utilization of warm air discharged from the two vortex tubes 41 and 42 prevents freezing of urea.

Operation of the cooling device 40 of the present embodiment will now be described. When the ECU 50 drives the compressor 36, outside air is pumped to and dried by the dryer 37. The dry air is supplied to the oxygen enrichment unit 38 and separated into oxygen-enriched gas and nitrogen-enriched gas. The oxygen-enriched gas is introduced to the first vortex tube 42, and the cooled oxygen-enriched gas is introduced to the ozone generator 31 via the first supply passage 35a. Oxygen in the oxygen-enriched gas introduced to the ozone generator 31 is converted to ozone, which is ejected by the ozone supply nozzle 32 via the ozone supply passage 33. Warm air in the oxygen-enriched gas is supplied to the heat exchanger 23a of the urea solution tank 23 from the warm air outlet 42d through the warm air passage 43.

Nitrogen-enriched gas separated by the oxygen enrichment unit 38 is supplied to the second vortex tube 41 through the second supply passage 35b. Cool air separated by the second vortex tube 41 is discharged from the cool air outlet 41c and ejected to the absorbent material 31b of the ozone generator 31. In the same way as the first embodiment, drain water discharged from the dryer 37 is supplied to the absorbent material 31b through the drain water supply passage 37a. Further, the warm air discharged from the warm air outlet 41d of the second vortex tube 41 is supplied to the heat exchanger 23a of the urea solution tank 23 through the warm air passage 43.

As described above, according to the exhaust purifying system of the second embodiment, the following advantages are obtained in addition to the advantages (1) and (2) described in the first embodiment.

(3) The exhaust purifying system 20 includes the warm air passage 43, which introduces warm air discharged from the second vortex tube 41 to the urea solution tank 23, and the heat exchanger 23a, which increases the temperature of the urea solution with the warm air sent through the warm air passage 43. This prevents freezing of the urea solution in a cold environment. This also allows effective utilization of heat energy of the warm air discharged from the second vortex tube 41.

(4) The first vortex tube 42 separates oxygen-enriched gas separated by the oxygen enrichment unit 38 into cool air and warm air and discharges the cool air and the warm air separately. The ozone producing device 30 introduces the cool air discharged from the first vortex tube 42 to the ozone generator 31 and produces ozone from the oxygen-enriched gas at a low temperature as a source. That is, in the first vortex tube 42, air itself is not cooled, but oxygen involved in a reaction to produce ozone is intensively cooled. Thus, the ozone producing space is cooled, and the cooling efficiency for oxygen, which is a source of ozone, is increased. This improves the ozone production efficiency.

Third Embodiment

A third embodiment of the present invention will now be described with reference to FIG. 7. In the third embodiment, only the ozone producing device in the second embodiment is replaced with an ozone producing device 30. Like reference characters designate like or corresponding parts and the parts will not be described in detail.

Figure 7:
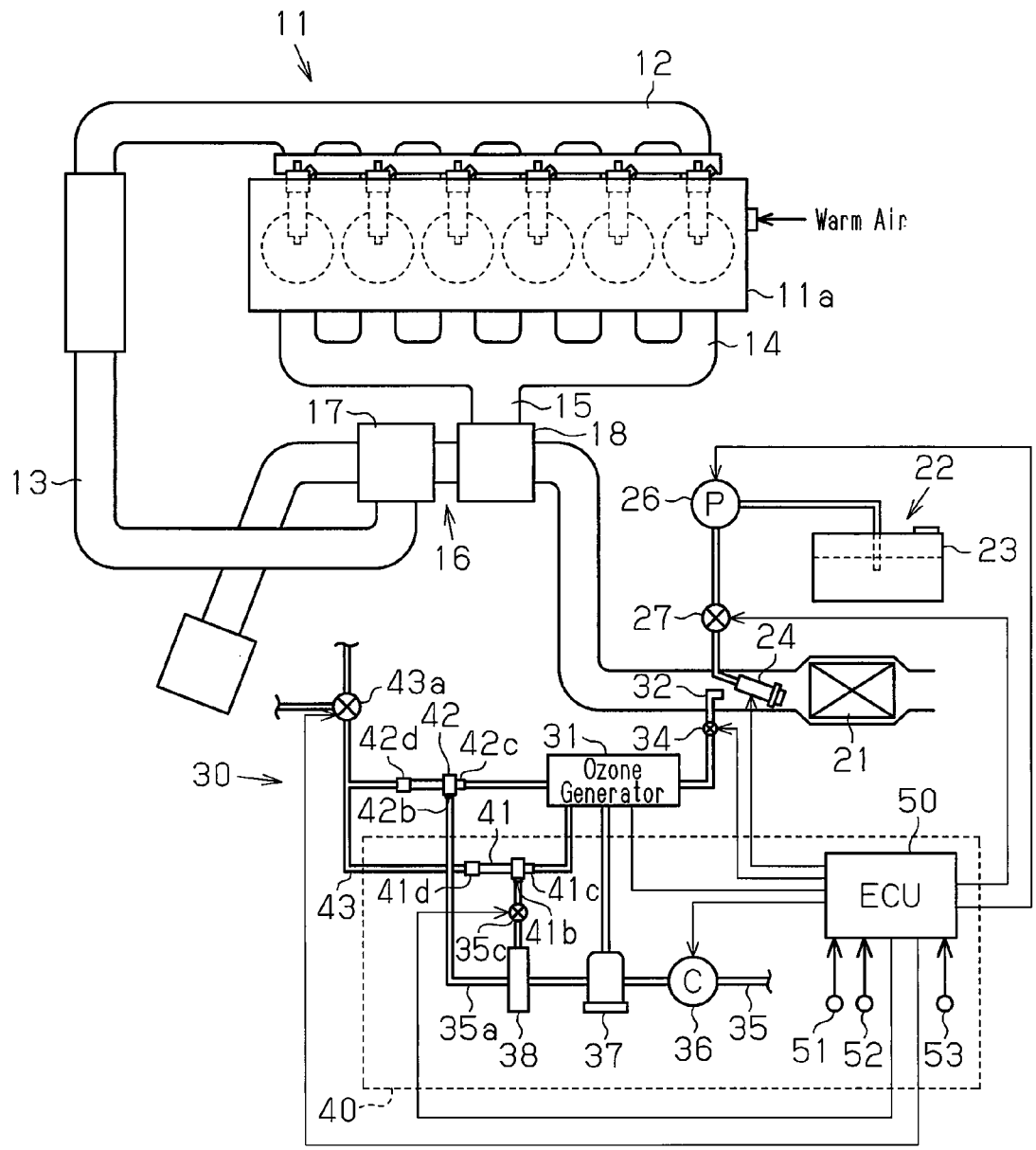
FIG. 7 is a schematic view of an exhaust purifying system together with an engine according to a third embodiment of the present invention.

As shown in FIG. 7, in the same way as the second embodiment, downstream of the oxygen enrichment unit 38, the second vortex tube 41 is arranged on the second supply passage 35b, through which nitrogen-enriched gas is pumped, and the first vortex tube 42 is arranged on the first supply passage 35a, through which oxygen-enriched gas is pumped.

The inlet 42b of the first vortex tube 42 is connected to the oxygen enrichment unit 38 via the first supply passage 35a. The cool air outlet 42c of the first vortex tube 42 is connected to the ozone generator 31 via the first supply passage 35a. Therefore, cool air from the first vortex tube 42, i.e., cooled oxygen-enriched gas, is introduced to the ozone generator 31.

The warm air outlet 42d of the first vortex tube 42 is connected to the engine 11 via the warm air passage 43. For example, the exit of the warm air passage 43 is connected to a cylinder head 11a of the engine 11. The cylinder head 11a includes a flow passage through which warm air passes to exchange heat between the warm air and the cylinder head 11a. The three-way valve 43a is arranged on the warm air passage 43. The warm air outlet 42d is connected to the engine 11 by opening the valve 43a, and the warm air outlet 42d is connected to the outside by closing the valve 43a. This allows the ECU 50 to control opening and closing of the valve 43a to connect the warm air outlet 42d with the engine 11 only when there is a need to warm up the engine 11.

The cool air outlet 41c of the second vortex tube 41 is connected to the absorbent material 31b of the ozone generator 31 via the second supply passage 35b in the same way as the first embodiment. The warm air outlet 41d is connected to the cylinder head 11a of the engine 11 via the warm air passage 43.

As described above, according to the exhaust purifying system of the third embodiment, the following advantage is obtained in addition to the advantages (1) and (2) described in the first embodiment and the advantage (4) described in the second embodiment.

(5) In the third embodiment, the warm air passage 43 and the heat exchanger are provided. The warm air passage 43 guides warm air toward the engine 11, the warm air discharged from the second vortex tube 41, to which nitrogen-enriched gas is introduced. The heat exchanger warms up the engine 11 with the warm air sent through the warm air passage 43. The warm air is used effectively to warm up the engine 11 at the starting and the like.

The above embodiments may be modified for implementation as described below.

Figure 8:
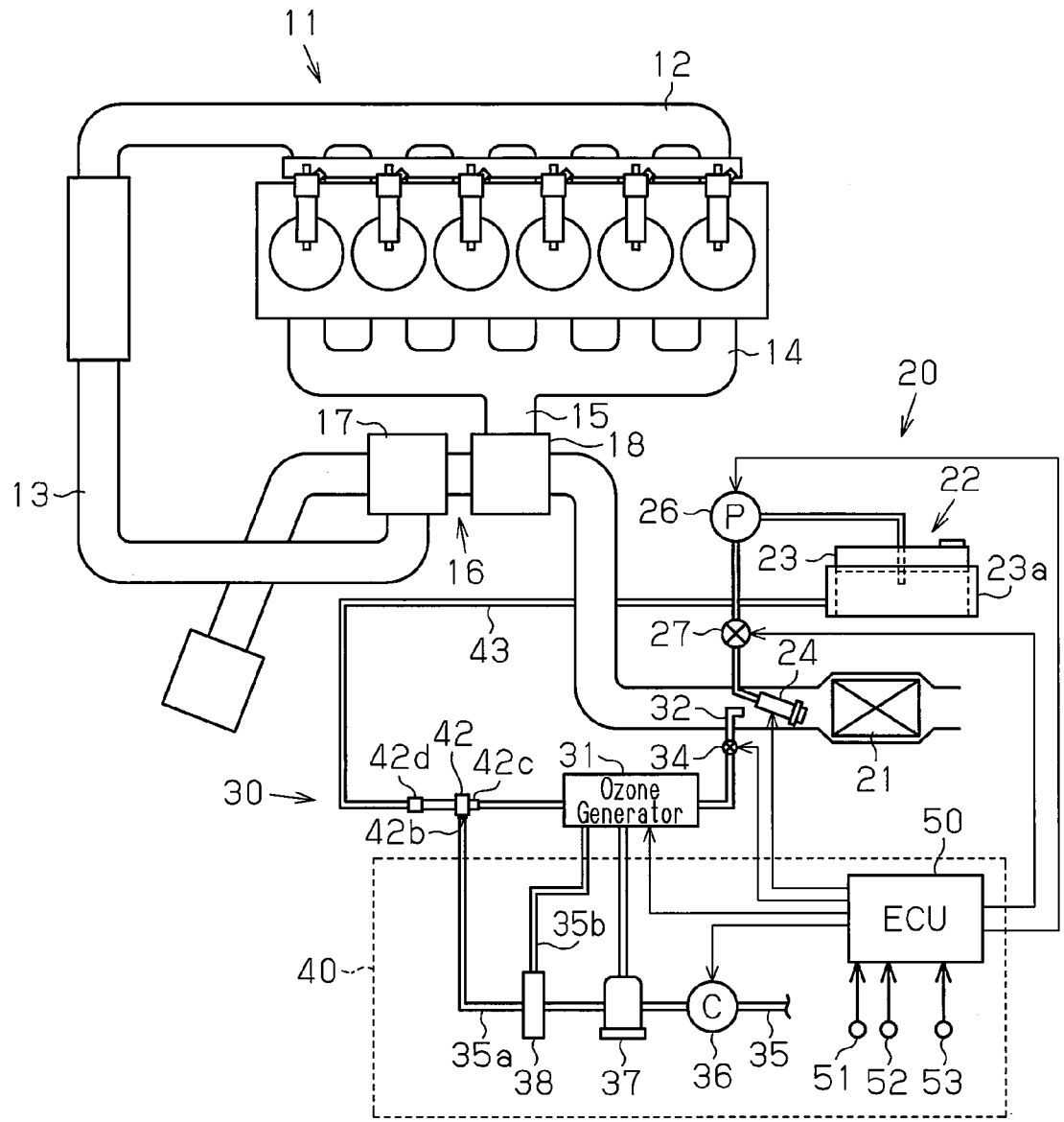
FIG. 8 is a schematic view of an exhaust purifying system together with an engine according to a modification of the present invention.

The second and third embodiments employ the first vortex tube 42 for introducing oxygen-enriched gas and the second vortex tube 41 for introducing nitrogen-enriched gas. However, as shown in FIG. 8, only the first vortex tube 42 may be provided for the exhaust purifying system 20 and the ozone producing device 30. Even in this case, oxygen, which is a source of ozone, is cooled and, gas other than oxygen contained in cool air such as nitrogen cools the electrodes and the housing. This cools the ozone producing space entirely. In this case, nitrogen-enriched gas discharged from the oxygen enrichment unit 38 is ejected to the absorbent material 31b of the ozone generator 31 without passing through the vortex tube 41. Even this case promotes vaporization of drain water absorbed in the absorbent material 31b.

The above first to third embodiments provide the oxidation catalyst and the DPF upstream of the selective reduction catalyst 21 on the exhaust passage 15. However, the oxidation catalyst may be omitted.

The above first to third embodiments store a urea solution as a urea fluid. However, the urea fluid may be another substance capable of producing ammonia when reacting with $NO_x$. Ammonia or ammonia water may be used as a urea fluid in vehicles designed to be capable of carrying the ammonia or ammonia water.

In the above first to third embodiments, the present invention is exemplified by the dryer 37, which uses a hollow fiber membrane. However, other types of dryers may be employed such as a dryer filled with desiccant. When desiccant is used for the dryer 37, warm air discharged from the vortex tube 41 may be used in regeneration of the desiccant.

The dryer 37 removes water from compressed air and discharges the water as drain water. The dryer 37 may discharge only water vapor as the drain water. Also in this case, the drain water supply passage 37a guides the water vapor discharged from the dryer to the ozone generator 31, and the water permeates the absorbent material 31b.

The ozone generator 31 is not limited to the aforementioned device. For example, the absorbent material 31b may be omitted, and the cooling device 40 may just eject cool air of the vortex tube 41 toward the ozone generator 31. The ozone generator 31 is not limited to the electrostatic discharge type device and may be a corona discharge type or electrolysis type device.

In the above first to third embodiments, the exit of the cool air passage 41e is arranged such that cool air comes into the face of the absorbent material 31b at an angle. However, the exit of the cool air passage 41e may be arranged such that cool air comes into the face of the absorbent material 31b at a right angle.

In the above first to third embodiments, the body 31a of the ozone generator 31 has a housing made of a metallic material, and the absorbent material 31b is closely attached to the housing. Alternatively, the absorbent material 31b may form a wall of the housing. In this case, the absorbent material 31b may form the entire wall of the housing or a portion of the wall as shown in FIG. 4.

The above first to third embodiments do not supply ozone when the temperature of exhaust gas is low. Alternatively, regardless of the exhaust gas temperature, ozone may be consistently supplied when a urea solution is supplied.

In the above first to third embodiments, the ECU 50 computes an ozone supply amount based on a map and an operating condition of the engine 11, but a method how to decide the ozone supply amount is not limited to that. For example, a $NO_2$ sensor and a NO sensor may be arranged upstream of the ozone supply nozzle 32 on the exhaust passage 15 to compute an ozone supply amount per unit time based on the ratio of $NO:NO_2$ and an exhaust flow rate.

In the above first to third embodiments, a gas separator is formed with the oxygen enrichment unit 38 using an oxygen-enriched film but may have another structure capable of separating oxygen from air. An example is a pressure swing adsorption (PSA) type device, in which nitrogen is adsorbed onto an adsorbent and compression and decompression are repeated to separate nitrogen from the adsorbent.

As shown in FIG. 8, only the vortex tube 42 for cooling oxygen-enriched gas may be provided for the exhaust purifying system or ozone producing device of the present invention. That is, in the cooling structure of the ozone generator 31, nitrogen-enriched gas separated by the oxygen enrichment unit 38 is ejected to the absorbent material 31b soaked with drain water supplied from the dryer 37. The vortex tube 42 separates oxygen-enriched gas separated from the oxygen enrichment unit 38 into cool air and warm air and supplies the cool air to the ozone generator 31. Even with such an exhaust purifying system or ozone producing device, the ozone producing space is cooled by the cooled oxygen-enriched gas introduced to the ozone producing space, thereby suppressing self-decomposition of ozone.

In the above first to third embodiments, the ozone producing device 30 is applied to the exhaust purifying system 20 to promote oxidation of NO. However, the ozone producing device 30 may be used in other devices or systems for other purposes. An example is a device or system that uses ozone for a purpose such as pollutant degradation, sterilization, deodorization, or bleaching.

In the above first to third embodiments, the exhaust purifying system 20 is applied to a diesel engine, but may be applied to gasoline engines. The exhaust purifying system 20 is applied to an engine with a supercharging device, but may be applied to naturally aspirated gasoline engines or diesel engines. The exhaust purifying system 20 is applied to a vehicle engine, but may be applied to engines of vessels or aircrafts.

What is claimed is:

1. An exhaust purifying system comprising:
a selective reduction catalyst provided on an exhaust passage of an engine;
a fluid supply device configured to supply a urea fluid to a section of the exhaust passage that is upstream of the selective reduction catalyst;
a gas separator for separating source gas into oxygen-enriched gas and nitrogen-enriched gas;
an ozone generator that includes an ozone producing space, to which the oxygen-enriched gas is introduced, and produces ozone from the introduced oxygen-enriched gas;
an ozone supplier for supplying ozone to a section of the exhaust passage that is upstream of the selective reduction catalyst;
a vortex tube for separating the nitrogen-enriched gas into cool air and warm air and discharging the cool air and the warm air; and
a cooling device configured to cool the ozone producing space by applying the cool air discharged from the vortex tube to the ozone generator, wherein
the vortex tube is a first vortex tube, and the system further comprises a second vortex tube for separating the oxygen-enriched gas into cool air and warm air and discharging the cool air and the warm air separately, and
the cool air discharged from the second vortex tube is introduced to the ozone generator to produce ozone from the oxygen-enriched gas at a low temperature.

2. The exhaust purifying system according to claim 1, further comprising:
a warm air passage for guiding the warm air discharged from the vortex tube to the fluid supply device;
a heat exchanger for increasing the temperature of the urea fluid with the warm air sent through the warm air passage; and
a valve for opening and closing the warm air passage.

3. The exhaust purifying system according to claim 1, further comprising:
a warm air passage for guiding the warm air discharged from the vortex tube toward the engine;
a heat exchanger for warming up the engine with the warm air sent through the warm air passage; and
a valve for opening and closing the warm air passage.

4. The exhaust purifying system according to claim 1, further comprising:
a compressor for compressing air; and
a dryer for drying compressed gas sent from the compressor and sending the dried compressed gas to the gas separator, wherein
the cooling device further includes:
a drain water supply passage for guiding water removed from the compressed gas by the dryer to the ozone generator; and
an absorbent material provided in the ozone generator, and
the cooling device causes the water to permeate the absorbent material and vaporizes water that has permeated the absorbent material by applying cool air ejected from the vortex tube to the absorbent material.

5. An ozone producing device comprising:
a gas separator for separating source gas into oxygen-enriched gas and nitrogen-enriched gas;
an ozone generator that includes an ozone producing space, to which the oxygen-enriched gas is introduced, and produces ozone from the introduced oxygen-enriched gas;
a vortex tube for separating the nitrogen-enriched gas into cool air and warm air and discharging the cool air and the warm air; and
a cooling device configured to cool the ozone producing space by applying the cool air discharged from the vortex tube to the ozone generator, where
the vortex tube is a first vortex tube, and the device further comprises
a second vortex tube for separating the oxygen-enriched gas into cool air and warm air and discharging the cool air and the warm air, wherein the cool air discharged from the vortex tube is introduced to the ozone generator to produce ozone from the oxygen-enriched gas at a low temperature.

* * * * *